United States Patent [19]

Terwilliger

[11] 4,364,367
[45] Dec. 21, 1982

[54] LINKAGE MECHANISM FOR SUPERCHARGER SYSTEM

[75] Inventor: Gerald L. Terwilliger, Wixom, Mich.

[73] Assignee: Eaton Corporation, Cleveland, Ohio

[21] Appl. No.: 214,358

[22] Filed: Dec. 8, 1980

[51] Int. Cl.³ .............................................. F02B 33/44
[52] U.S. Cl. .................................. 123/564; 123/559; 60/611; 60/613
[58] Field of Search ................... 123/564, 559; 60/600, 60/601, 611, 13

[56] References Cited

U.S. PATENT DOCUMENTS

| | | | |
|---|---|---|---|
| 2,383,198 | 8/1945 | Jorgensen | 123/564 |
| 2,559,859 | 7/1951 | Elliott et al. | 123/559 |
| 3,868,822 | 3/1975 | Keller | 60/611 |

*Primary Examiner*—Raymond A. Nelli

*Attorney, Agent, or Firm*—C. H. Grace; F. M. Sajovec

[57] ABSTRACT

Disclosed is an induction or supercharger system (16) for a piston engine (10) having a Roots type blower (14) for supercharging an air-fuel mixture from a carburetor (12) having primary and secondary throttle valves (64) and (66). The induction system defines a naturally aspirated flow path, a recirculation flow path, and a supercharger flow path. The flow paths are controlled by valves (18) and (20). Valves (18, 64 and 66) are moved between their respective opened and closed positions by a linkage mechanism (44) including a lever (72) and linkage assemblies (74) and (76). The linkage assemblies include resilient means (88) and (102) which respectively move the throttle valves open and the valve (18) closed. Valve (20) is opened in response to a differential pressure across the naturally aspirated flow path and the supercharger flow path.

6 Claims, 4 Drawing Figures

LINKAGE MECHANISM FOR SUPERCHARGER SYSTEM

CROSS-REFERENCE TO RELATED APPLICATIONS

This application is related to U.S. patent application Ser. No. 214,304, filed Dec. 8, 1980; U.S. patent application Ser. No. 214,301, filed Dec. 8, 1980; and to U.S. patent application Ser. No. 214,305, filed Dec. 8, 1980. Both applications are assigned to the assignee of this application.

FIELD OF THE INVENTION

This application relates to supercharger systems and more specifically to a linkage mechanism for a supercharger system selectively operable in both a naturally aspirated mode and in a supercharged mode.

BACKGROUND OF THE INVENTION

During the last several years increasing cost and reduced availability of fuel has motivated many automobile manufacturers to produce more fuel efficient vehicles by not only reducing vehicle weight but by also reducing engine power relative to vehicle weight, thereby depriving motorists of accustomed vehicle performance, such as power for acceleration, hill climbing, etc. To regain the acceleration and hill climbing power and still retain fuel efficiency many automotive manufacturers have offered or considered offering vehicles with supercharger systems having displacement or turbodynamic blowers which are either mechanically driven by the engine crankshaft or turbine driven by the engine exhaust gases. Such systems though well-known have not met with great acceptance even though they had been satisfactorily used for years to maintain aircraft engine power with increasing altitude and to increase racing car speeds. Most of the automobile superchargers have been of the turbine driven-turbodynamic blower type commonly referred to as turbochargers, a few have been of the mechanically driven-displacement blower type, e.g., vane or Roots blowers V-belt driven by the engine crankshaft.

The turbochargers in automobiles have been disappointing for several reasons. They have been relatively inefficient when operated outside of their range of maximum efficiency, have had slow response, have required relatively complicated and expensive controls to prevent over boost and engine damage, and have required large hot ducts in the already cramped and overheated engine compartments to direct exhaust gases to and from the turbine. Of these, the most unacceptable is probably slow response in boosting engine power for accelerating the vehicle from zero or low speeds.

The supercharger systems with mechanically driven displacement type blowers in automobiles have also been disappointing for several reasons. When used to deliver air to the engine full time over the full operating range of the engine, they have also been relatively inefficient and have caused rough low speed engine operation. When used in combination with a bypass duct to deliver naturally aspirated air to the engine at low engine engine speeds and/or low engine power settings to improve rough low-speed engine operation, they have also been relatively inefficient and have had either slow response, as with turbochargers, or have had an overly fast response which causes a stepwise increase in engine power and therefore cause jerky vehicle operation. Further, supercharger systems with displacement type blowers have been subject to catastrophic failure due to engine backfire unless provided with special blowout valves.

SUMMARY OF THE INVENTION

An object of the invention is to provide an efficient induction system for a supercharged engine.

Another object of the invention is to provide a supercharger induction system having a linkage mechanism which readily controls the pressure of supercharged air in response to and in coordination with engine power demand.

According to a feature of the invention an expansible combustion chamber engine includes a manifold having an inlet and and outlet for respectively receiving air via a throttle means and delivering the air to the chamber, and first and second air flow paths connected in parallel between the inlet and outlet; a supercharger interposed in the second path; and a valve means including a valving member and means responsive to differential air pressure between the inlet and outlet, the valving member being moveable between first and second positions to control air flow in the first path for regulating the differential pressure between minimum and maximum pressures, and the pressure responsive means operative to move the valving member toward the first position to decrease the differential pressure in response to the differential pressure exceeding the maximum; the improvement comprising: power control means including means relatively moveable between minimum and maximum engine power positions and first and second linkage assemblies connected in parallel at one end to the selectively moveable means and connected at the end to the valving member and the throttle means.

BRIEF DESCRIPTION OF THE DRAWINGS

The supercharger system of the instant invention is shown in the accompanying drawings in which.

Figure 1:
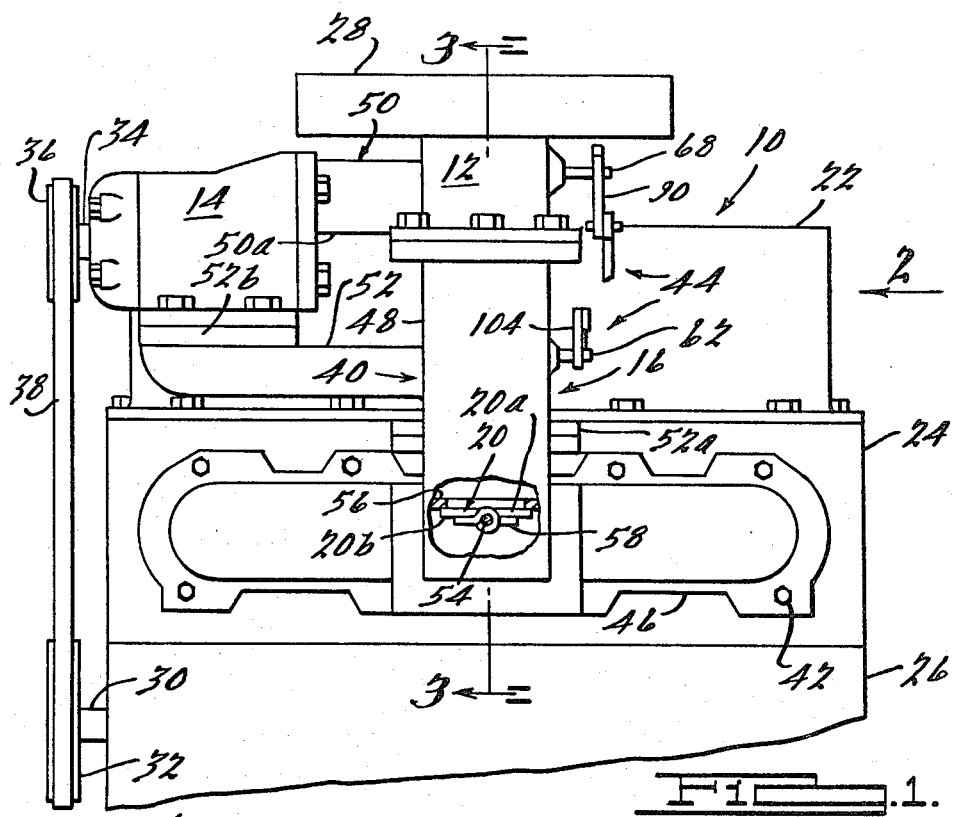
FIG. 1 is a side elevational view of the supercharger system mounted on a partially shown engine.

Certain terminology referring to proposed environment, direction, and motion will be used in the following description. This terminology is for convenience and clarity in describing the invention and should not be considered limiting in the appended claims unless the claims are explicitly so limited.

DETAILED DESCRIPTION OF THE DRAWINGS

Looking first at FIGS. 1-4 in general, therein is disclosed a partially shown engine 10 equipped with a carburetor 12, a supercharger 14, and an induction or supercharger system 16. The induction system includes a valve 18 (see FIGS. 3 and 4) operative in its full open position of FIG. 3 to direct the flow of an air-fuel mixture from the carburetor to the engine via a first or natural aspiration path and to direct discharge air from the supercharger outlet back to the supercharger inlet via a recirculation path. Valve 18 is operative in its fully closed position to block the recirculation path and direct the supercharged air-fuel mixture from the supercharger outlet to the engine via a valve 20 which is spring biased to its closed position.

Carburetor 12 may be a single point fuel injector and is preferably disposed upstream of the supercharger as shown herein. However, carburetor 12 may be positioned downstream of the supercharger and may be deleted in lieu of multiple fuel injector nozzles which may inject fuel either into the manifold or directly into the expansible chambers of the engine. Further, engine 10 is preferably an Otto cycle engine of the type used in automotive and truck type vehicles. However, the engine may be of the diesel cycle type, in which case carburetor 12 would be replaced by fuel injection nozzles which inject fuel directly into the expansible chambers. Herein, engine 10 is a conventional four-cylinder, four-stroke, spark-ignited engine wherein each cylinder defines an expansible chamber having inlet and outlet ports controlled by poppet valves which are actuated by a camshaft driven by a crankshaft; none of these components are shown since they do not form part of the instant invention and since they are well-known. Portions of the engine, which are shown, include a valve cover 22, a head assembly 24, a block assembly 26, an air filter 28, and a crankshaft driven shaft 30 having a V-pulley 32 fixed thereto.

Supercharger 14, which may be a turbine driven variable or positive displacement blower, is preferably a mechanically driven positive displacement blower. Herein, the supercharger is a Roots type blower having two unshown rotors with three helical lobes each. The rotors are driven by a shaft 34 having a V-pulley 36 fixed thereto and mechanically connected to V-pulley 32 via a V-belt 38. Hence, the fluid or air-fuel mixture displacement of the supercharger is in direct proportion to engine speed.

Supercharger 14 is also preferably of the type which does not compress fluid being displaced by the blower until the fluid reaches the blower outlet, that is, the displaced air is compressed only when the pressure in the region of the blower outlet is elevated. Roots blowers are of this type and are substantially more efficient when operating in a recirculation mode than blowers which compress fluid prior to displacement of the fluid at the blower outlet. For example, when valve 18 is open, the supercharger outlet is connected to the supercharger inlet via the recirculation path. Hence, when in the recirculation mode, the supercharger will only absorb the amount of energy necessary to circulate the fluid, since the supercharger inlet and outlet pressures are substantially the same. If the supercharger were of the type which compresses fluid prior to displacement at its outlet, the supercharger would further absorb the energy necessary to compress the fluid, which energy would then be mostly wasted when the fluid is displaced into the recirculation path.

A Roots type blower is further preferred when induction system 16 is used with an Otto cycle engine, since the adiabatic efficiency of such a blower is relatively high in the 1.0 to 1.5 pressure ratios normally used with Otto cycle engines. To further save energy either of the V-pulleys 32 or 36 could be replaced by a clutch mechanism, e.g., a magnetic clutch such as disclosed in U.S. Pat. No. 3,494,453. Such clutches are well-known and it should suffice herein to say that the clutch could be automatically controlled in response to engine operating parameters, one such parameter could be throttle position and/or the clutch could be controlled by a manually operated switch.

Looking now at induction system 16 in a more specific manner, the system includes an intake manifold assembly 40 fixed to head assembly 24 by a plurality of bolts 42 and a linkage mechanism 44 which is only partially shown in FIG. 1. Manifold assembly 40 includes duct assemblies 46 and 48 and supercharger inlet and outlet ducts 50 and 52. The duct assemblies and ducts may be attached to each other in any of several conventional ways, e.g., welding, clamping, and/or bolted flanges. Herein the lower end 48a of duct assembly 48 is welded to duct assembly 46, one end 50a of supercharger inlet duct 50 is welded to duct assembly 48 and one end 52a of supercharger outlet duct 52 is flange mounted to duct assembly 46. The other ends 50b and 52b of ducts 50 and 52 are flange mounted to the supercharger inlet and outlet, respectively, as best seen in FIG. 1. Manifold assembly 40 is shown herein substantially as it was fabricated for a prototype of the supercharger system. It is contemplated that the assembly will be made substantially smaller and more compact in actual production to reduce the system bulk, passage length, and passage volume.

Figure 3:
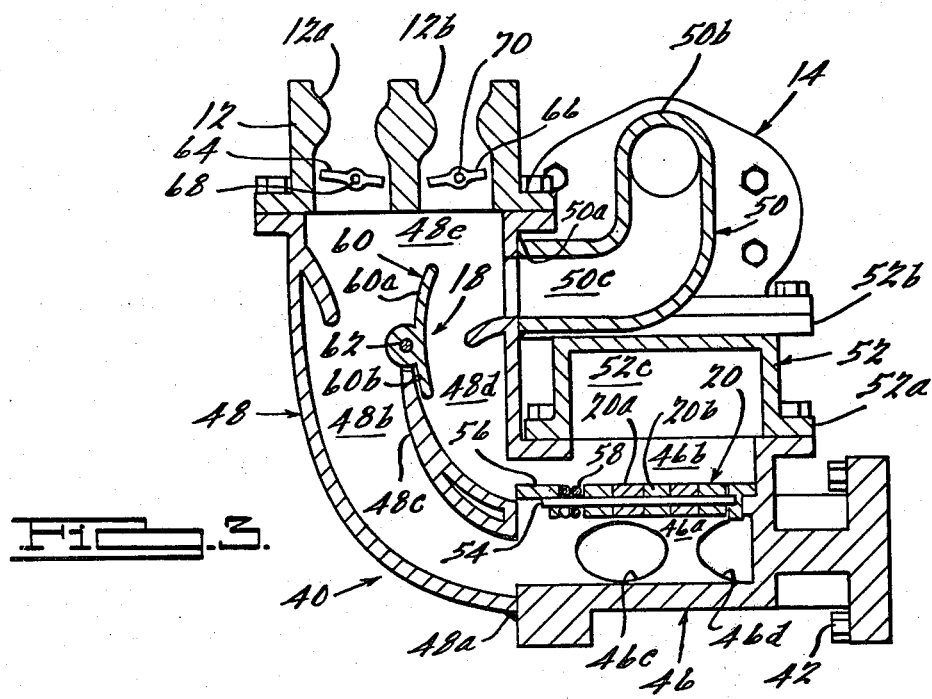
FIGS. 3 and 4 are cross sectional views of the system looking along line 3—3 of FIG. 1.
Figure 4:
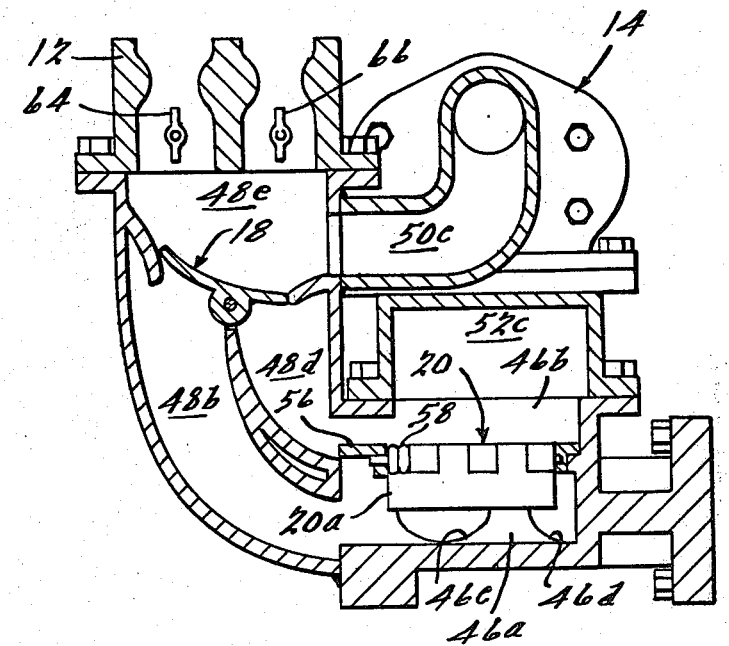

Looking mainly at FIGS. 3 and 4, duct assembly 46 includes chambers 46a and 46b, which are separated by the valve 20, and four passages which extend diagonally from chamber 46a to the unshown poppet valve controlled inlets of the four expansible chambers of engine 10. Two of the four diagonal passages 46c and 46d are visible in FIGS. 3 and 4. Compartment 46a is in continuous communication with a passage 48b defined by the exterior walls of duct assembly 48 and a partition 48c. Compartment 46b is in continuous communication with a passage 52c defined by supercharger outlet duct 52 and with a passage 48d defined by the exterior walls of duct assembly 48 and partition 48c. Compartment 46b is in continuous communication with a passage 52c defined by supercharger outlet duct 52 and with a passage 48d defined by the extension walls of duct assembly 48 and partition 48c.

Valve 20, which is also visible in the broken away portion of FIG. 1, includes flapper type valving members 20a and 20b which pivot about a hinge pin 54 supported by a rectangular frame member 56. Frame 56 also functions as the valve seat for the flappers which are biased toward the seat or closed position by a torsion spring 58. Spring 58 maintains the flappers in their closed position of FIGS. 1 and 3 when the fluid pressure in compartments 46a and 46b is substantially the same. The fluid pressure in compartments 46a and 46b or the difference in fluid pressure is controlled by valve 18. As valve 18 moves from its open position of FIGS. 1 and 3 toward its closed position of FIG. 4 the fluid pressure difference begins to increase, whereby the flappers are moved by the differential pressure to their open position of FIG. 4.

The flow of air-fuel mixture in passages 48b and 48d is controlled by valve 18. Valve 18 includes a butterfly type valving member 60 which pivots about the axis of a shaft 62 rotatably supported by the walls of duct assembly 48. One end of shaft 62 extends through one of the walls and is visible in FIGS. 1 and 2. As may be seen in FIG. 4, valving member 60 cooperates with a valve seat defined by the lobes projecting from the walls of duct assembly 48. Valving member 60 is provided with unequal surface areas 60a and 60b on opposite sides of its pivotal axis and is moved from the open position to the closed position in response to counterclockwise rotation of shaft 62, as viewed in FIGS. 2 and 3.

The upper portion of duct assembly 48 above valve 18 defines a chamber or passage 48e which is in continuous communication with a passage 50c defined by supercharger inlet duct 50. Passage 48e receives an air-fuel mixture from carburetor 12 by way of primary and secondary throats 12a and 12b which are controlled by primary and secondary throttle valves 64 and 66. Carburetor 12 and throttle valves 64 and 66 in particular form part of the power control means. The throats receive ambient air through filter 28 which is not shown in FIGS. 3 and 4. Fuel is mixed with the air in a conventional manner as the air passes through the throats. The amount of air passing through the throats is controlled by the throttle valves in conjunction with the rotational speed of the engine. The valves are respectively fixed to shafts 68 and 70 which are rotatably supported by the carburetor walls. One end of each shaft extends through a wall of the carburetor. Shaft 68 is visible in FIG. 1 and both shafts are visible in FIG. 2. The throttle valves 64 and 66 are respectively rotated clockwise and counterclockwise from their substantially closed positions of FIG. 3 to their full open positions of FIG. 4.

In brief, induction system 16, as mentioned in the first paragraph of the detailed description, defines a first or naturally aspirated air-fuel flow path, a second or supercharged air-fuel flow path, and a recirculation air-fuel flow path. The first path is defined by passage 48e, the left side of valve 18, passage 48b, chamber 46a, and the diagonal passages connecting chamber 46a with the expansible chamber inlets. The second path is defined by passage 48e, passage 50c, supercharger 14, passage 52c, chamber 46b, valve 20, chamber 46a, and the diagonal passages. The recirculation path is defined by passage 52c, chamber 46b, passage 48d, the right side of valve 18, and passages 48e and 50c.

Figure 2:
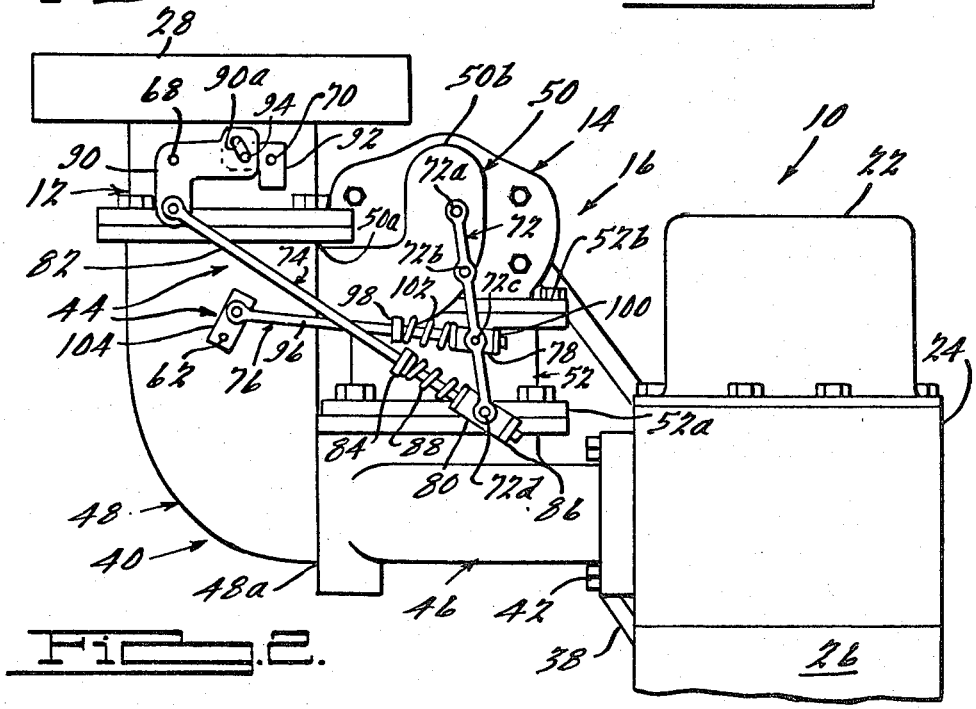
FIG. 2 is an end elevational view of the system looking in the direction of an arrow 2 in FIG. 1.

Looking now at linkage mechanism 44, as best seen in FIG. 2, the mechanism in conjunction with throttle valves 64 and 66, butterfly valve 18, and flapper valve 20 forms the power control means for engine 10. Mechanism 44 includes a pivotal lever 72 and linkage assemblies 74 and 76 connected in parallel for respectively controlling the throttle valves and the butterfly valve. Lever 72 includes an opening 72a for attachment of a control rod or cable moved by an accelerator pedal of a vehicle, an opening 72b for attachment of an unshown pivot support fixed to the engine, an opening 72c pivotally attached to a collar 78 of linkage assembly 76, and an opening 72d pivotally attached to a collar 80 of linkage assembly 74.

Linkage assembly 74 includes the collar 80 slidably mounted on a rod 82, stop rings 84 and 86 fixed to the rod, a helical compression spring 88 positioned between collar 80 and stop ring 84, an L-shaped bell crank 90 fixed to shaft 68 of the primary throttle valve 64 and pivotally attached to rod 82, and a lever 92 fixed to shaft 70 of the secondary throttle valve. Lever 92 is connected to bell crank 90 via a lost motion connection including a pin 94 fixed to lever 92 and projecting into an arcuate opening 90a defined by bell crank 90. Opening 90a has a radius of curvature centered on the axis of shaft 68.

Linkage assembly 76 includes the collar 78 slidably mounted on a rod 96, stop rings 98 and 100 fixed to the rod, a helical compression spring 102 positioned between stop ring 98 and collar 78, and a lever 104 fixed at one end to shaft 62 of the butterfly valve and pivotally attached at the other end to rod 96.

OPERATION

Assume now that engine 10 is installed in a vehicle having an automatic transmission wherein about ninety percent of the accelerator pedal movement fully opens the carburetor throttle valves and the remainder of the accelerator pedal movement downshifts the transmission into a passing or lower speed ratio gear when the transmission is in high gear and the vehicle speed is less than some predetermined amount. Also assume that depression of the accelerator pedal applies a rightwardly directed force to attachment point 72a of lever 72 and that an unshown spring applies a leftwardly directed force to attachment point 72a for returning lever 72 to its idle or minimum power position of FIG. 2 when the accelerator pedal is released. As may be seen in FIG. 2, a rightwardly directed force applied to attachment point 72a rotates lever 72 clockwise about attachment point 72b and applies a leftwardly directed force to collars 78 and 80 of the linkage assemblies for resiliently moving bell crank 82 via spring 88 and rod 82 and for resiliently moving lever 104 via spring 102 and rod 96. Lever 72 and linkage assemblies 74 and 76, which are not drawn to exact scale, are arranged such that about fifty percent of full clockwise rotation of lever 72 from its minimum power position of FIG. 2 effects simultaneous opening and closing rotation, respectively, of primary throttle valve 64 and butterfly valving member 60 while secondary throttle valve 66 remains closed. This intermediate or fifty percent position of lever 72 rotates primary throttle valve 64 about seventy-five percent of its full travel from its substantially closed position of FIG. 3 toward its full open or vertical position of FIG. 4. In this position throttle valve 64 is substantially full open since there is little increase in air flow through throat 12a solely in response to additional opening movement of the throttle valve. The intermediate or fifty percent position of lever 72 rotates butterfly valving member 60 of valve 18 to a position sufficiently close to its closed position to effect a slight pressure difference across the valving member, i.e., the pressure in passage 48d becomes slightly greater than the pressure in passage 48e since this valving member position slightly restricts the flow of naturally aspirated air-fuel mixture to passage 48b and slightly restricts the flow of recirculation air-fuel mixture in passage 48d from the supercharger outlet back to the supercharger inlet. Hence, in about the fifty percent position of pivotal lever 72, engine 10 is still operating basically in the naturally apsirated mode, i.e., suction from the expansible chambers is still providing vertically all of the force for moving the air-fuel mixture through the induction to the engine. The slight pressure difference also acts across valve 20 and applies an opening force to flappers 20a and 20b which negates or balances the closing force of torsion spring 58, whereby the flappers thereafter progressively moved from their closed positions toward their open positions as the pressure difference increases in response to additional closing movement of valving member 60 by lever 72 through linkage assembly 76.

With lever 72 in about the fifty percent position, spring 102 modulates the position of valving member 60 in combination with the difference in surface areas 60a and 60b to maintain the slight pressure difference relatively constant substantially independent of minor variations in engine speed. For example, if the engine load increases with lever 72 fixed at the fifty percent position, the engine speed will decrease and so will the amount of air-fuel mixture flowing in the induction system. Hence, the slight pressure difference across valving member 60 will tend to decrease, thereby decreasing the counter or feedback force to spring 102 due to the surface area difference of valving member 60 and thereby allowing the resilient force of spring 102 to move the valving member toward its closed position enough to maintain the slight pressure difference relatively constant. If the engine load decreases with lever 72 again fixed at the fifty percent position, the engine speed will increase and so will the amount of air-fuel mixture flowing in the induction system. Hence, the slight pressure difference across valving member 60 will tend to increase, whereby the feedback force increases and moves the valving member towards its open position against spring 102 to maintain the slight pressure difference relatively constant. The difference in surface area of valving member 60 and the resilient force of spring 102 allows the engine to operate substantially in the naturally aspirated mode over a relatively large speed range when lever 72 is near or at its fifty percent position of full travel.

As previously mentioned, the first fifty percent movement of lever 72 rotates bell crank 90 clockwise. This amount of rotation takes up the lost motion provided by arcuate opening 90a. Continued clockwise rotation of bell crank 90, due to further rotation of lever 72, effects a counterclockwise rotation of secondary throttle valve shift 70, thereby moving the secondary throttle valve towards its full open position while simultaneously moving primary throttle valve 64 further towards its vertical or fully open position and while simultaneously rotating butterfly valving member 60 further towards its fully closed position. At about the ninety percent position of lever 72 the primary and secondary throttle valves are fully open and the butterfly valving member 60 is fully closed. When in this position the power control means and lever 72, which is part of the power control means, are in the maximum power position. Further movement of lever 72 is absorbed by springs 88 and 102, thereby allowing the accelerator pedal to actuate a transmission downshift mechanism, not shown.

During movement of lever 72 from the fifty percent position to the ninety percent position, the resilient forces applied by spring 102 progressively increase to move butterfly valving member 60 to its fully closed position, thereby progressively blocking the naturally aspirated and recirculation paths and allowing the pressure of the air-fuel mixture in the supercharger path to progressively increase from about zero pounds per square inch gauge to about six pounds per square inch gauge as both a function of the position of lever 72 and the rotational speed of engine 10. During this period of pressure increase, the flappers of valve 20 move from their closed to their fully open positions. Hence, a vehicle operator by simple manipulation of the accelerator pedal can smoothly transition from the naturally aspirated or unboosted mode of operation to a full boost mode of operation by progressively depressing the accelerator pedal or he can modulate the boost pressure at any partial amount needed for any particular driving situation. Further, since valving member 60 is resiliently moved from its first position to its second position, any abnormally high pressures in passage 48b, such as backfire pressures, will act on the unequal areas 60a and 60b and force valving member 60 towards its first position against the resilient force of spring 102. Hence, valving member 60 in combination with spring 102 provides the dual function of modulating boost pressure and the safety function of protecting against catastrophic failure due to engine backfire through the induction system.

The induction system as disclosed herein provides engine 10 with a relatively efficient naturally aspirated flow path for medium and low engine power settings, smooth transition to and from the supercharger flow path, and when needed an almost instantaneous boost in supercharger pressure to its maximum boost (which herein by way of example is six pounds per square inch gauge) even at relatively low engine speeds. Further, since linkage assemblies 74 and 76 are connected in parallel from lever 72 to their respective valves, the amount of movement of the respective valves in response to a given amount of accelerator pedal movement may be readily varied independent of each other by merely varying the position of openings 72a, 72b, 72c, and 72d with respect to each other. Additionally, since the linkage assemblies are in parallel an optimum spring rate or rates may be selected to control valve 18 via linkage assembly 76 without affecting the operation of the throttle valves by linkage assembly 74. Hence, the linkage assemblies of linkage mechanism 44 may be readily adapted to fit a great variety of vehicles which in turn may have a variety of operating demands requiring a shift in the transition points between natural aspiration, partial supercharging, and full supercharging.

A preferred embodiment of the invention has been disclosed for illustrative purposes. Many variations and modifications of the preferred embodiment are believed to be within the spirit of the invention. For example, carburetor 12 could be provided with only primary throttle valves or a single throttle valve; in which case the system may transition to the supercharger path prior to or after the throttle valve or valves have fully opened. The following claims are intended to cover the inventive portions of the preferred embodiment and variations and modifications believed to be within the spirit of the invention.

What is claimed is:

1. In an engine of the type including an expansible combustion chamber; an induction manifold having an inlet and an outlet for respectively receiving air via a throttle means and delivering the air to the chamber, and first and second air flow paths connected in parallel between the inlet and outlet; a supercharger interposed in the second path; and valve means including a valving member and means responsive to differential air pressure between the inlet and outlet, said valving member moveable between first and second positions to control air flow in said first path for regulating said differential air pressure between a minimum and a maximum air pressure, and said pressure responsive means operative to move said valving member toward said first position to decrease said differential pressure in response to said differential pressure exceeding said maximum pressure; the improvement comprising:

power control means including means selectively moveable between minimum and maximum engine power positions and first and second linkage assemblies connected in parallel at one end to said selectively moveable means and respectively connected at the other end to said valving member and said throttle means.

2. The engine of claim 1, wherein said selectively moveable means includes:

a lever mounted for pivotal movement about a point and having said one ends of said linkage assemblies pivotally connected thereto at unequally spaced positions from said point.

3. The engine of claim 1, wherein said throttle means includes:
   a primary throttle valve connected directly to said other end of said second linkage assembly; and
   a secondary throttle valve connected to said primary throttle valve via a lost motion means.

4. The engine of claim 1, wherein said selectively moveable means and said throttle means include:
   a lever mounted for pivotal movement about a point and having said one ends of said linkage assemblies pivotally connected thereto at unequally spaced positions from said point;
   a primary throttle valve connected directly to said other end of said second linkage assembly; and
   a secondary throttle valve connected to said primary throttle valve via a lost motion means.

5. The engine of claim 1, 2, 3, or 4, wherein said first linkage assembly includes:
   resilient means interposed between said selectively moveable means and said valving member.

6. The engine of claim 1, 2, 3, or 4, wherein said linkage assemblies each include:
   resilient means interposed between said selectively moveable means and the respective throttle means and valving member.

* * * * *